US009045848B2

(12) United States Patent
Jimbo et al.

(10) Patent No.: US 9,045,848 B2
(45) Date of Patent: Jun. 2, 2015

(54) COORDINATE COMPUTATION DEVICE AND SEWING MACHINE

(71) Applicants: Masaru Jimbo, Kasugai (JP); Yutaka Nomura, Anjo (JP); Kentaro Torii, Nagoya (JP); Kazuki Kojima, Nagoya (JP); Daisuke Honda, Nagoya (JP)

(72) Inventors: Masaru Jimbo, Kasugai (JP); Yutaka Nomura, Anjo (JP); Kentaro Torii, Nagoya (JP); Kazuki Kojima, Nagoya (JP); Daisuke Honda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 14/223,031

(22) Filed: Mar. 24, 2014

(65) Prior Publication Data
US 2014/0290551 A1     Oct. 2, 2014

(30) Foreign Application Priority Data

Mar. 28, 2013   (JP) .................................. 2013-068089

(51) Int. Cl.
| | | |
|---|---|---|
| *D05B 19/16* | (2006.01) | |
| *G06F 3/00* | (2006.01) | |
| *D05B 19/02* | (2006.01) | |

(52) U.S. Cl.
CPC ...... *D05B 19/16* (2013.01); *G06F 3/00* (2013.01); *D05B 19/02* (2013.01)

(58) Field of Classification Search
CPC ........ D05B 19/02; D05B 19/12; D05B 19/14; D05B 19/16; G05B 2219/2626; G05B 2219/45195
USPC ............................ 112/102.5, 470.03, 470.05; 700/136–138
See application file for complete search history.

(56) References Cited

U.S. PATENT DOCUMENTS

| | | |
|---|---|---|
| 2013/0233217 A1 | 9/2013 | Shimizu et al. |
| 2013/0233219 A1 | 9/2013 | Nakamura et al. |
| 2013/0233220 A1 | 9/2013 | Nomura et al. |
| 2013/0233221 A1 | 9/2013 | Abe et al. |

(Continued)

FOREIGN PATENT DOCUMENTS

| | | |
|---|---|---|
| JP | 2004139191 A | 5/2004 |
| JP | A-2004-139191 | 5/2004 |
| JP | 2010009542 A | 1/2010 |
| JP | A-2010-9542 | 1/2010 |

(Continued)

OTHER PUBLICATIONS

U.S. Appl. No. 14/638,645, filed Mar. 4, 2015 in the name of Jimbo et al.

*Primary Examiner* — Danny Worrell
(74) *Attorney, Agent, or Firm* — Oliff PLC

(57) ABSTRACT

A coordinate computation device includes a position indication portion, a detection portion, a processor, and a memory. The position indication portion includes an indicating portion, a switch, and a transmitter. The detection portion is configured to detect ultrasonic waves transmitted by the transmitter. The memory is configured to store computer-readable instructions. The computer-readable instructions cause the processor to perform processes that include computing sets of first coordinates, based on times when the detection portion detects the ultrasonic waves, computing a movement direction of the position indication portion on a plane, computing an angle formed between the plane and a direction in which the position indication portion is long, and computing a set of second coordinates, based on the computed movement direction, the computed angle, and a set of third coordinates among the sets of the computed first coordinates.

14 Claims, 12 Drawing Sheets

(56) References Cited

U.S. PATENT DOCUMENTS

| | | | |
|---|---|---|---|
| 2013/0233222 A1 | 9/2013 | Nishimura et al. | |
| 2014/0290551 A1 | 10/2014 | Jimbo et al. | |

FOREIGN PATENT DOCUMENTS

| | | |
|---|---|---|
| JP | 2013188261 A | 9/2013 |
| JP | 2013188262 | 9/2013 |
| JP | 2013188263 A | 9/2013 |
| JP | 2013188264 A | 9/2013 |
| JP | 2013188265 A | 9/2013 |
| JP | A-2013-188261 | 9/2013 |
| JP | A-2013-188262 | 9/2013 |
| JP | A-2013-188263 | 9/2013 |
| JP | A-2013-188264 | 9/2013 |
| JP | A-2013-188265 | 9/2013 |
| JP | 2014191692 A | 10/2014 |

| DISTRIBUTION DENSITY Mm (dot/mm) | ANGLE α |
|---|---|
| Mm<80 | 0° ~ 15° |
| 80≦Mm<120 | 15° ~ 30° |
| 120≦Mm<160 | 30° ~ 45° |
| 160≦Mm<200 | 45° ~ 60° |
| 200≦Mm<240 | 60° ~ 75° |
| 240≦Mm | 75° ~ 90° |

COORDINATE COMPUTATION DEVICE AND SEWING MACHINE

CROSS-REFERENCE TO RELATED APPLICATION

This application claims priority to Japanese Patent Application No. 2013-068089 filed Mar. 28, 2013, the content of which is hereby incorporated herein by reference.

BACKGROUND

The present disclosure relates to a coordinate computation device and to a sewing machine that includes the coordinate computation device.

A device that includes an ultrasound pen is known as a coordinate computation device.

An ultrasound pen is known that includes two ultrasonic wave transmitters. Two points can be specified by the two ultrasonic wave transmitters, and the angle and direction of the ultrasound pen, which is a position indication portion that is configured to indicate a position, can be specified, making it possible to compute the coordinates of the indicated point.

SUMMARY

In a case where the ultrasound pen includes the two ultrasonic wave transmitters, the number of parts is increased in the ultrasound pen. That may cause an increase in the size of the ultrasound pen.

Embodiments of the broad principles derived herein provide a coordinate computation device and a sewing machine that are able to compute an angle and a direction of a position indication portion by using one ultrasonic wave transmitter.

Embodiments provide a coordinate computation device that includes a position indication portion, a detection portion, a processor, and a memory. The position indication portion includes an indicating portion, a switch, and a transmitter. The indicating portion is configured to indicate a position on a plane. The transmitter is configured to transmit ultrasonic waves. The position indication portion is long in a direction of a virtual straight line that passes through the indicating portion and the transmitter. The detection portion is configured to detect the ultrasonic waves that are transmitted by the transmitter. The memory is configured to store computer-readable instructions. The computer-readable instructions cause the processor to perform a process that includes computing sets of first coordinates, based on times when the detection portion detects the ultrasonic waves. The sets of the first coordinates respectively indicates positions on the plane that respectively correspond to positions of the transmitter at a time when the switch is turned on and at times before and after the switch is turned on. The computer-readable instructions further cause the processor to perform a process that includes computing a movement direction of the position indication portion on the plane, based on at least one part of the sets of the computed first coordinates. The computer-readable instructions further cause the processor to perform a process that includes computing an angle that is formed between the plane and the direction in which the position indication portion is long, based on at least one part of the sets of the computed first coordinates. The computer-readable instructions further cause the processor to perform a process that includes computing a set of second coordinates, based on the computed movement direction, the computed angle, and a set of third coordinates among the sets of the computed first coordinates. The set of the second coordinates indicates an indicated point on the plane. The indicated point is the position that is indicated by the indicating portion. The set of the third coordinates indicates a position on the plane that corresponds to the position of the transmitter at the time when the switch is turned on.

Embodiments also provide a sewing machine that includes a bed, a position indication portion, a detection portion, a processor, and a memory. The bed includes a bed surface being a top surface thereof The position indication portion includes an indicating portion, a switch, and a transmitter. The indicating portion is configured to indicate a position on the bed surface. The transmitter is configured to transmit ultrasonic waves. The position indication portion is long in a direction of a virtual straight line that passes through the indicating portion and the transmitter. The detection portion is configured to detect the ultrasonic waves that are transmitted by the transmitter. The memory is configured to store computer-readable instructions. The computer-readable instructions cause the processor to perform a process that includes computing sets of first coordinates, based on times when the detection portion detects the ultrasonic waves. The sets of the first coordinates respectively indicates positions on the bed surface that respectively correspond to positions of the transmitter at a time when the switch is turned on and at times before and after the switch is turned on. The computer-readable instructions further cause the processor to perform a process that includes computing a movement direction of the position indication portion on the bed surface, based on at least one part of the sets of the computed first coordinates. The computer-readable instructions further cause the processor to perform a process that includes computing an angle that is formed between the bed surface and the direction in which the position indication portion is long, based on at least one part of the sets of the computed first coordinates. The computer-readable instructions further cause the processor to perform a process that includes computing a set of second coordinates, based on the computed movement direction, the computed angle, and a set of third coordinates among the sets of the computed first coordinates. The set of the second coordinates indicates an indicated point on the bed surface. The indicated point is the position that is indicated by the indicating portion. The set of the third coordinates indicates a position on the bed surface that corresponds to the position of the transmitter at the time when the switch is turned on.

BRIEF DESCRIPTION OF THE DRAWINGS

Embodiments will be described below in detail with reference to the accompanying drawings in which.

DETAILED DESCRIPTION

Figure 1:
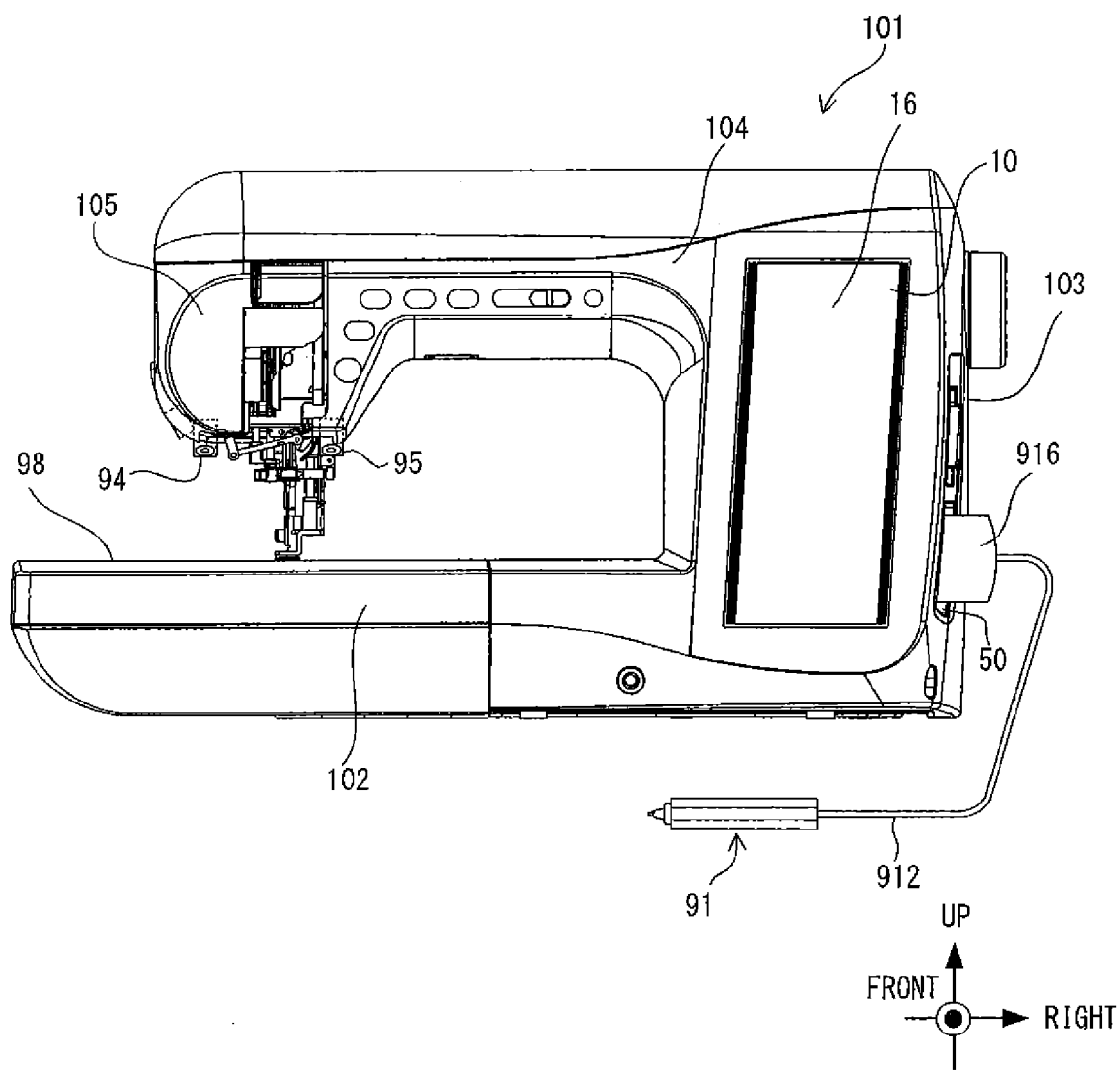
FIG. 1 is a front view of a sewing machine.

Configuration of a Sewing Machine 101 A configuration of a sewing machine 101 according to an embodiment will be explained with reference to FIG. 1.

The sewing machine 101 includes a bed 102, a pillar 103, an arm 104, and a head 105. The bed 102 is a base portion of the sewing machine 101. The bed 102 includes a bed surface 98. A work cloth 100 (refer to FIG. 2) may be placed on the bed surface 98. A position on or above the bed surface 98 may be indicated by a pen tip 911 of an ultrasound pen 91 (refer to FIG. 2). The pillar 103 extends from the bed 102. The arm 104 extends horizontally from the pillar 103 such that the arm 104 faces the bed 102. The head 105 is provided on the end of the arm 104.

Directions in the sewing machine 101 in the present embodiment will be defined. The direction in which the pillar 103 extends from the bed 102 is the up direction in the sewing machine 101, and the opposite direction from the up direction is the down direction. The direction in which the arm 104 extends from the pillar 103 is the left direction in the sewing machine 101, and the opposite direction from the left direction is the right direction. The front-rear direction of the sewing machine 101 is a direction that is orthogonal to the left-right direction and to the up-down direction. A surface that is disposed on a liquid crystal display (LCD) 10, which will be described below, is the front face of the sewing machine 101.

The sewing machine 101 includes receivers 94, 95. The receivers 94, 95 are configured to detect ultrasonic waves that are transmitted from the ultrasound pen 91 on the bed 102.

The receivers 94, 95 are provided in the rear part of the bottom side of the head 105. The receiver 94 is provided in the left rear part of the bottom face of the head 105. The receiver 95 is provided in the right rear part of the bottom face of the head 105. The left-right distance between the receivers 94, 95 is the width of the head 105 in the left-right direction.

The LCD 10 is provided on the front face of the pillar 103. The LCD 10 displays various types of items, such as commands, illustrations, setting values, messages, and the like, for example. A touch panel 16 is provided on the surface of the LCD 10. Specifically, the touch panel 16 is provided on the front face of the LCD 10. The touch panel 16 is provided for the purpose of setting items. In concrete terms, the setting of an item is, in a case where a user uses the user's finger or a special touch pen to press on the touch panel 16, for the sewing machine 101 to recognize which item has been selected from among a plurality of items, based on the item that corresponds to the pressed position that has been detected by the touch panel 16. By pressing on the touch panel 16, the user is able to select a pattern to be sewn or a command to be executed.

A pen connector 50 is provided on the right side face of the pillar 103. The pen connector 50 is electrically connected to a pen connector 916. The pen connector 916 connects to a cable 912 that extends from the ultrasound pen 91, which will be described below. The sewing machine 101 may supply electric power to the ultrasound pen 91 through the pen connector 50, the pen connector 916, and the cable 912.

Explanation of the Ultrasound Pen 91

Figure 2:
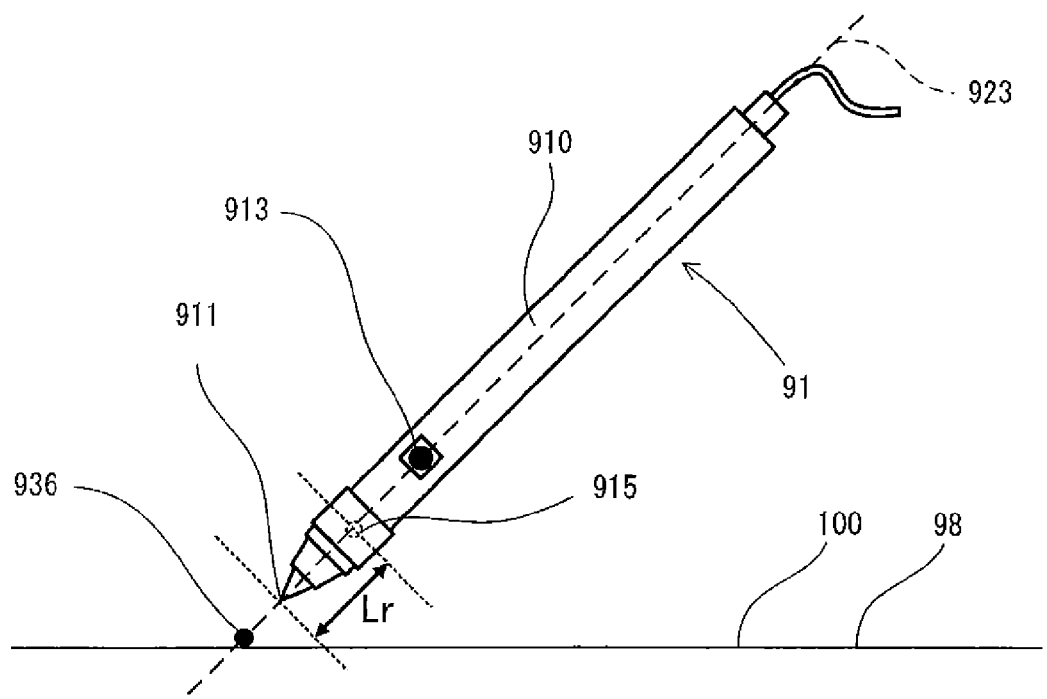
FIG. 2 is a figure for explaining a structure of an ultrasound pen.

The ultrasound pen 91 will be explained with reference to FIG. 2. The ultrasound pen 91 includes a pen body 910, the pen tip 911, a switch 913, and a transmitter 915. The ultrasound pen 91 has a shape that the user can grip.

The shape of the pen body 910 is a rod shape. The pen body 910 extends in a direction of a virtual line 923 that connects the pen tip 911 and the center of the transmitter 915.

The pen tip 911 is provided at one end of the pen body 910 in its longitudinal direction. The end of the pen body 910 is sharp.

The switch 913 is provided in a position where the switch 913 can be operated by the user's index finger when the user is gripping the ultrasound pen 91. Specifically, the switch 913 is provided in a position that is between the pen tip 911 and the longitudinal center of the pen body 910. The user may press the switch 913 in a situation in which the user has used the pen tip 911 to indicate an indicated point 936 (described below) on the bed surface 98 (the work cloth 100).

The transmitter 915 is provided in the vicinity of the pen tip 911. A distance Lr between the transmitter 915 and the pen tip 911 may be 20 millimeters, for example. One transmitter 915 is provided in the ultrasound pen 91.

In the sewing machine 101, the receivers 94, 95 may receive the ultrasonic waves that are transmitted from the ultrasound pen 91, as will be described in detail below. Based on the detected ultrasonic waves, the sewing machine 101 may specify the transmission source of the ultrasonic waves, that is, the position of the transmitter 915, which is provided in the ultrasound pen 91. The sewing machine 101 may perform sewing based on the specified position. By pressing the pen tip 911 of the ultrasound pen 91 against the work cloth 100, for example, the user is able to perform the sewing in a designated position on the work cloth 100.

Figure 3:
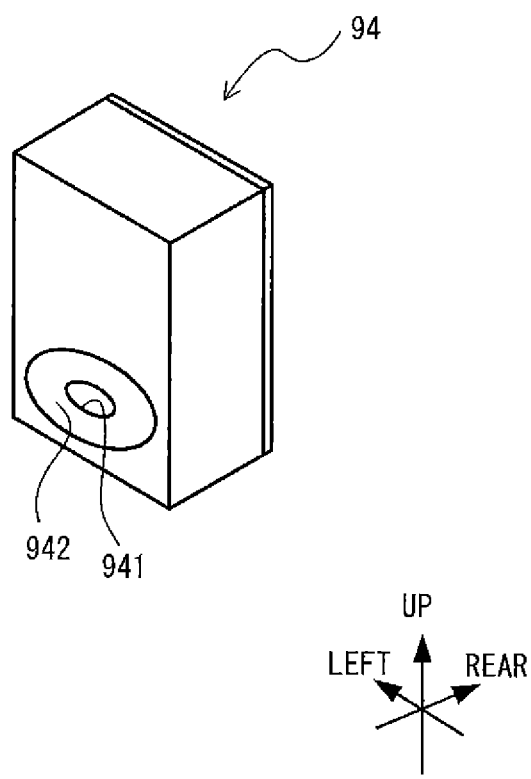
FIG. 3 is an oblique view of a receiver.

The receiver 94 will be described in detail with reference to FIG. 3. The receiver 95 has the same structure as the receiver 94, so an explanation of the receiver 95 will be omitted. The receiver 94 has a three-dimensional rectangular shape that is longer in the up-down direction. An opening 941 is provided in the center of the lower portion of the front face of the receiver 94. The opening 941 has an elliptical shape whose long axis extends in the left-right direction. A surrounding portion 942 around the opening 941 is a tapered surface that is inclined radially toward the front side. An electronic substrate and a microphone are provided in the interior of the receiver 94. The microphone is positioned on the inner side of the opening 941. A receiver connector is provided on the rear face of the upper end of the electronic substrate. The receiver connector may be connected to a connector that is provided in the sewing machine 1. The directionality of the receiver 94 is determined by the orientation of the opening 941 in relation to the microphone.

Electrical Configurations of the Sewing Machine 101 and the Ultrasound Pen 91

Figure 4:
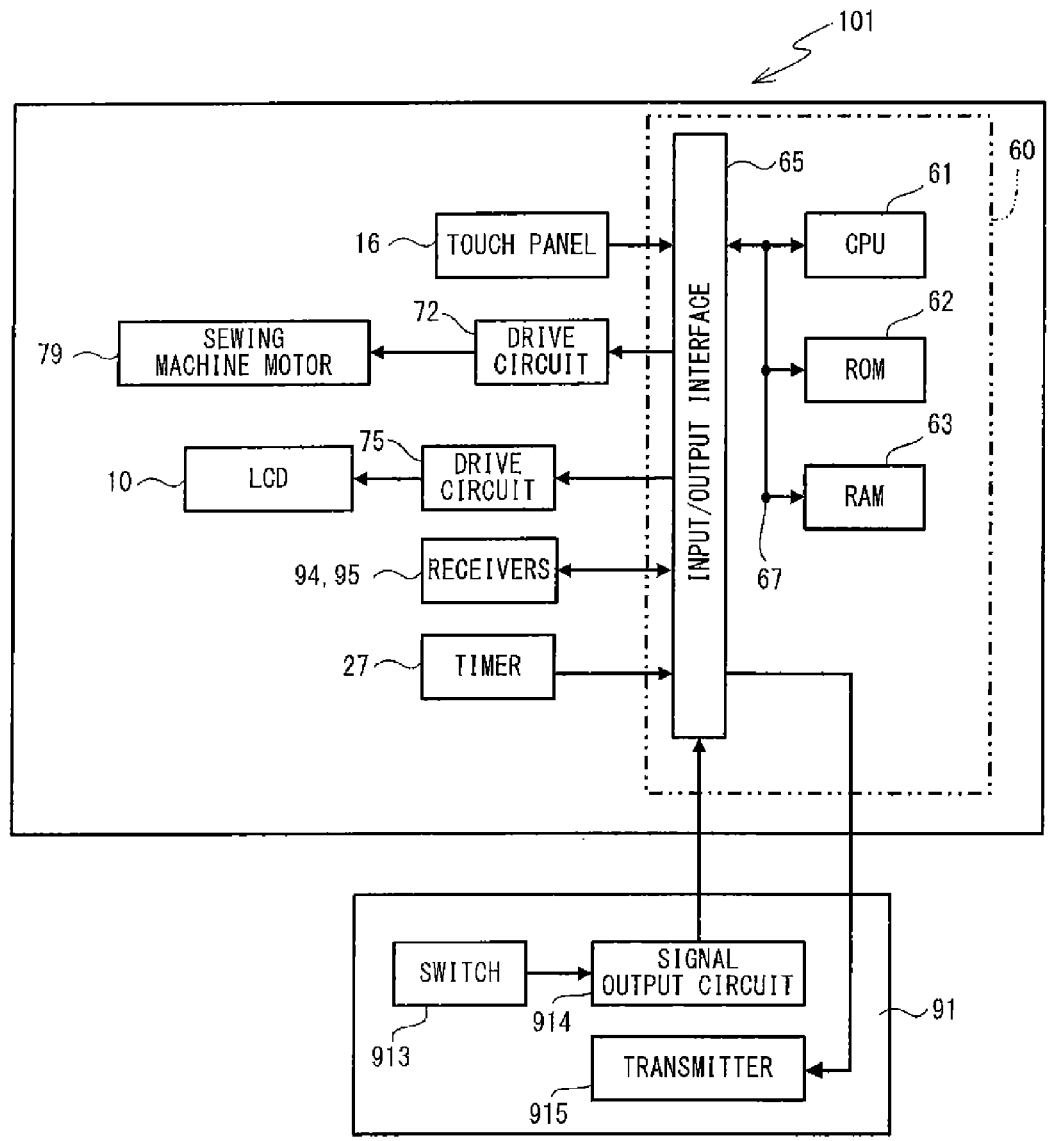
FIG. 4 is a block diagram that shows electrical configurations of the sewing machine and the ultrasound pen.

Electrical configurations of the sewing machine 101 and the ultrasound pen 91 will be explained with reference to FIG. 4. A control portion 60 of the sewing machine 101 includes a CPU 61, a ROM 62, a RAM 63, and an input/output interface 65. The CPU 61, the ROM 62, the RAM 63, and the input/output interface 65 are electrically connected to one another through a bus 67. The ROM 62 stores various types of programs, including a first coordinates computation program 500 and a second coordinates computation program 505, which will be described below, as well as data and the like.

The touch panel 16, a timer 27, drive circuits 72, 75, and the receivers 94, 95 are electrically connected to the input/output interface 65. The timer 27 may measure time. The drive circuits 72, 75 may drive a sewing machine motor 79 and the LCD 10, respectively.

The ultrasound pen 91 includes the switch 913, a signal output circuit 914, and the transmitter 915. The switch 913 is electrically connected to the signal output circuit 914. The signal output circuit 914 may be electrically connected to the input/output interface 65. The switch 913 is configured to turn on and off according to whether or not the switch 913 is pressed by the user's finger. In a case where the switch 913 is not pressed, that is, when the switch 913 is off, the signal output circuit 914 outputs a High signal to the CPU 61 through the cable 912 and the input/output interface 65. In a case where the switch 913 is pressed, that is, when the switch 913 is on, the signal output circuit 914 outputs a Low signal to the CPU 61 through the cable 912 and the input/output interface 65. Hereinafter, the Low signal that is output from the signal output circuit 914 is referred to as the indication signal. The switch 913, the signal output circuit 914, and the transmitter 915 are provided in the interior of the pen body 910. The transmitter 915 is configured to transmit the ultrasonic waves when the transmitter 915 receives a control signal from the CPU 61 that instructs the transmitter 915 to transmit the ultrasonic waves.

Data Configurations

Configurations of data that are stored in the ROM 62 and the RAM 63 will be explained with reference to FIGS. 5 and 6.

Figure 5:
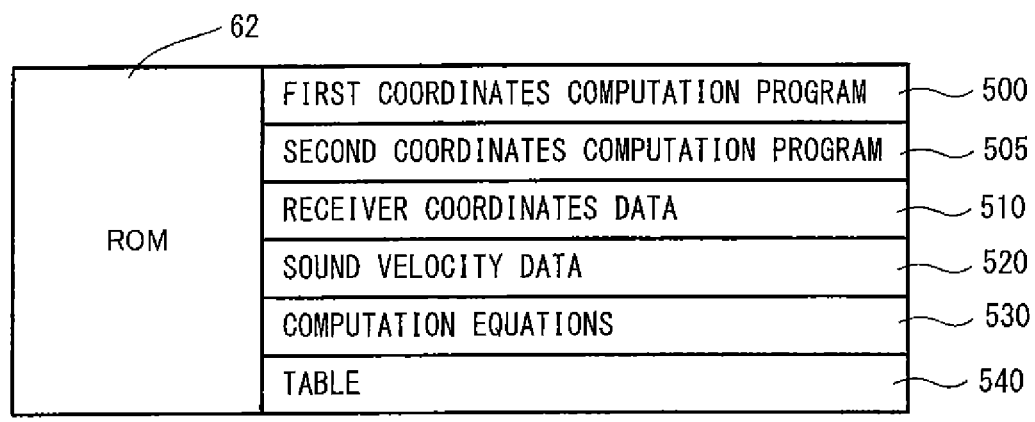
FIG. 5 is an explanatory figure that shows a configuration of data that are stored in a ROM.

As shown in FIG. 5, the ROM 62 stores the first coordinates computation program 500, the second coordinates computation program 505, receiver coordinates data 510, sound velocity data 520, computation equations 530, and a table 540. The first coordinates computation program 500 is a program for performing indicated point coordinates computation processing (refer to FIG. 8), which will be described below. The second coordinates computation program 505 is a program for performing transmitter coordinates computation processing (refer to FIG. 9), which will be described below. The receiver coordinates data 510, the sound velocity data 520, the computation equations 530, and the table 540 may be read out from the ROM 62 when coordinates E of the transmitter 915 are computed.

Figure 6:
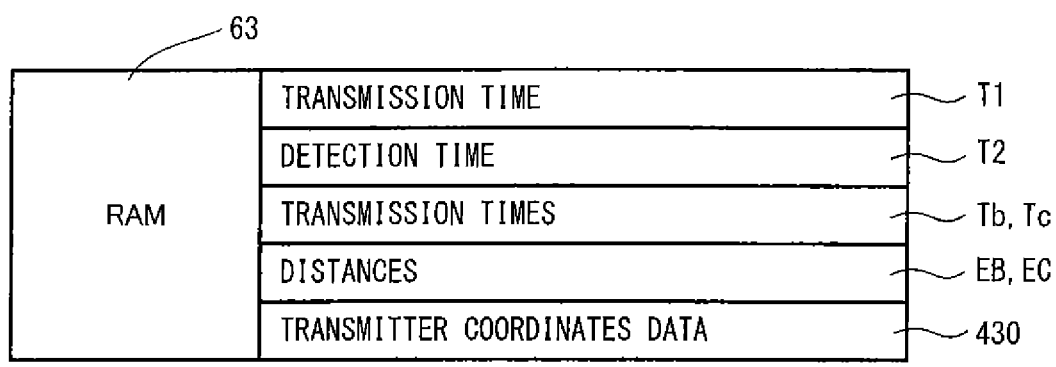
FIG. 6 is an explanatory figure that shows a configuration of data that are stored in a RAM.

As shown in FIG. 6, the RAM 63 functions as a temporary storage area that stores various types of variables and the like that the CPU 61 references when the CPU 61 executes the first coordinates computation program 500 and the second coordinates computation program 505 that are stored in the ROM 62. The various types of variables include, for example, a transmission time T1, a detection time T2, transmission times Tb, Tc, distances EB, EC, and transmitter coordinates data 430.

Method for Computing Coordinates of the Transmitter 915

Figure 7:
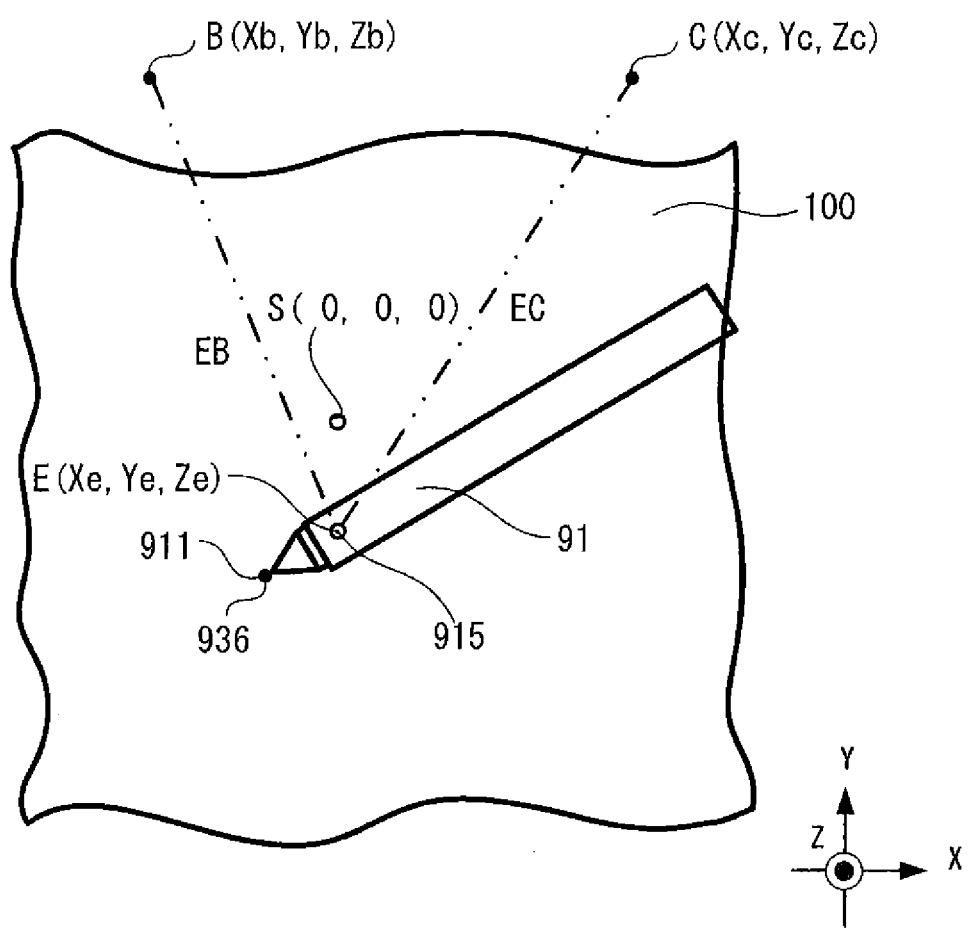
FIG. 7 is a figure for explaining a method for computing transmitter coordinates E.

A method for specifying the coordinates E of the transmitter 915 will be explained with reference to FIG. 7. The user may touch the pen tip 911 of the ultrasound pen 91 to the work cloth 100 and press the switch 913 to designate a position on the work cloth 100 where sewing is to be performed by the sewing machine 101. Hereinafter, the position where the pen tip 911 of the ultrasound pen 91 has touched the work cloth 100 is referred to as the indicated point 936. The sewing machine 101 can specify the indicated point 936 by specifying the coordinates E of the transmitter 915. The coordinates E of the transmitter 915 are different from the coordinates of the indicated point 936 where the pen tip 911 has touched the work cloth 100. It is therefore necessary to reconcile the discrepancy between the coordinates of the indicated point 936 of the pen tip 911 and the coordinates E of the transmitter 915 by performing the indicated point coordinates computation processing (refer to FIG. 8). Hereinafter, the left-right direction, the front-rear direction, and the up-down direction of the sewing machine 101 in FIG. 1 are referred to as the X axis direction, the Y axis direction, and the Z axis direction, respectively. In FIG. 7, the left-right direction and the up-down direction are equivalent to the X axis direction and the Y axis direction, respectively, while the direction that is orthogonal to the plane of the sheet is equivalent to the Z axis direction.

The sewing machine 101 may specify the coordinates E of the transmitter 915 in the form of (X coordinate, Y coordinate, Z coordinate). In the explanation that follows, a unit of 1 for the X coordinate, the Y coordinate, and the Z coordinate is equivalent to 1 millimeter. An origin point S (0, 0, 0) for the coordinates is defined as the center point of a needle hole that is formed in a needle plate and through which a sewing needle may pass. The plane at which the Z coordinate is zero indicates the top face of the needle plate. Coordinates B that indicate the position of the receiver 94 are defined as (Xb, Yb, Zb). Coordinates C that indicate the position of the receiver 95 are defined as (Xc, Yc, Zc). The coordinates E of the transmitter 915 are defined as (Xe, Ye, Ze). Hereinafter, the coordinates E are referred to as the transmitter coordinates E. The Z coordinates for the receivers 94, 95 indicate the heights of the receivers 94, 95 in relation to the top face of the needle plate. The distance between the transmitter coordinates E and the coordinates B is referred to as the distance EB. The distance between the transmitter coordinates E and the coordinates C is referred to as the distance EC.

Based on the Pythagorean theorem, the distances EB, EC can be described by the coordinates B, C, E. The distance EB and the coordinates B, E satisfy the relationship that is described by Equation (1) below. In the same manner, the distance EC and the coordinates C, E satisfy the relationship that is described by Equation (2) below.

$$(Xb-Xe)^2+(Yb-Ye)^2+(Zb-Ze)^2=(EB)^2 \qquad (1):$$

$$(Xc-Xe)^2+(Yc-Ye)^2+(Zc-Ze)^2=(EC)^2 \qquad (2):$$

Equation (1) is identical to an equation for a spherical surface for which the coordinates B define the center point, that has a radius of the distance EB, and that intersects the transmitter coordinates E. In the same manner, Equation (2) is identical to an equation for a spherical surface for which the coordinates C define the center point, that has a radius of the distance EC, and that intersects the transmitter coordinates E.

The velocity at which the ultrasonic waves travel is the sound velocity VS. The time that is required for the ultrasonic waves that are transmitted from the ultrasound pen 91 that is at the transmitter coordinates E to arrive at the receiver 94 is defined as the transmission time Tb. The time that is required for the ultrasonic waves that are transmitted from the ultrasound pen 91 that is at the transmitter coordinates E to arrive at the receiver 95 is defined as the transmission time Tc. In this case, the distances EB, EC can respectively be described by Equations (3) and (4) below.

$$EB=VS \times Tb \qquad (3):$$

$$EC=VS \times Tc \qquad (4):$$

Substituting Equations (3) and (4) into Equations (1) and (2) yields Equations (5) and (6) below.

$$(Xb-Xe)^2+(Yb-Ye)^2+(Zb-Ze)^2=(VS \times Tb)^2 \qquad (5):$$

$$(Xc-Xe)^2+(Yc-Ye)^2+(Zc-Ze)^2=(VS \times Tc)^2 \qquad (6):$$

In Equations (5) and (6), the coordinates B (Xb, Yb, Zb), the coordinates C (Xc, Yc, Zc), and the sound velocity VS are known values that have been stored in advance in the ROM 62 as the receiver coordinates data 510 and the sound velocity data 520. The Equations (1) to (6) are stored in the ROM 62 in advance as the computation equations 530. The transmission times Tb, Tc can be specified by computing the differences between the time that the ultrasonic waves are transmitted from the ultrasound transmitter 915 of the ultrasound pen 91 and the times that the ultrasonic waves are detected by the receivers 94, 95. Hereinafter, the time when the ultrasonic waves are transmitted from the ultrasound transmitter 915 of the ultrasound pen 91 is referred to as the transmission time T1. The times when the ultrasonic waves are detected by the receivers 94, 95, respectively, are referred to as the detection times T2. In the present embodiment, the difference between the Z coordinates of the transmitter 915 and the pen tip 911 is not taken into consideration. The value for the thickness of work cloth 100 is so much smaller than the values for Xe and Ye that the thickness of work cloth 100 can be ignored. Therefore, among the transmitter coordinates E (Xe, Ye, Ze), Ze may be regarded as being zero. Accordingly, the respective values for Xe and Ye are computed based on the simultaneous Equations (5) and (6). The transmitter coordinates E (Xe, Ye, Ze (=0)) that have been designated on the work cloth 100 by the ultrasound pen 91 are then computed by taking into consideration the directionalities of the receivers 94, 95, although a detailed explanation will be omitted.

Indicated Point Coordinates Computation Processing

Figure 8:
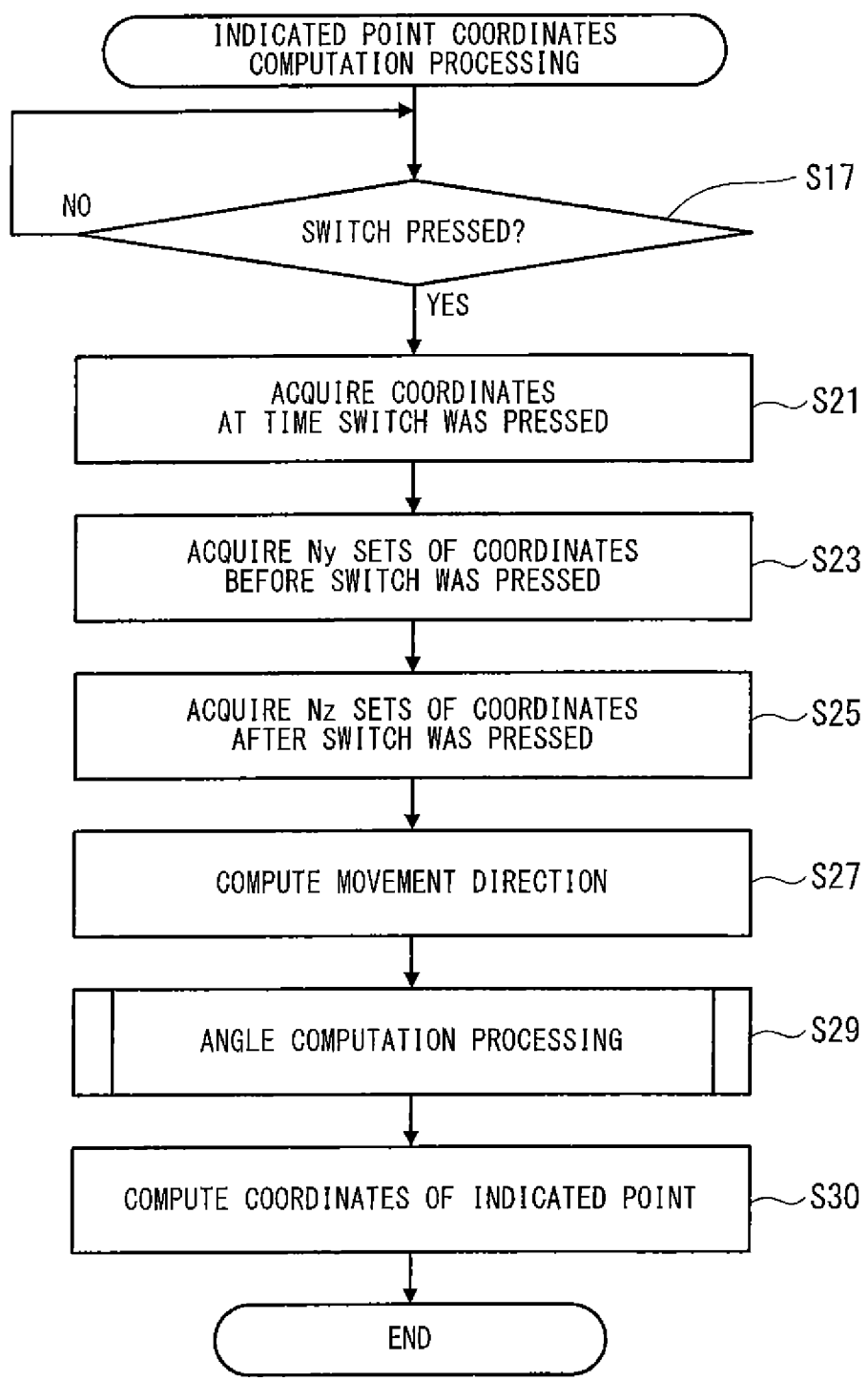
FIG. 8 is a flowchart that shows indicated point coordinates computation processing.
Figure 9:
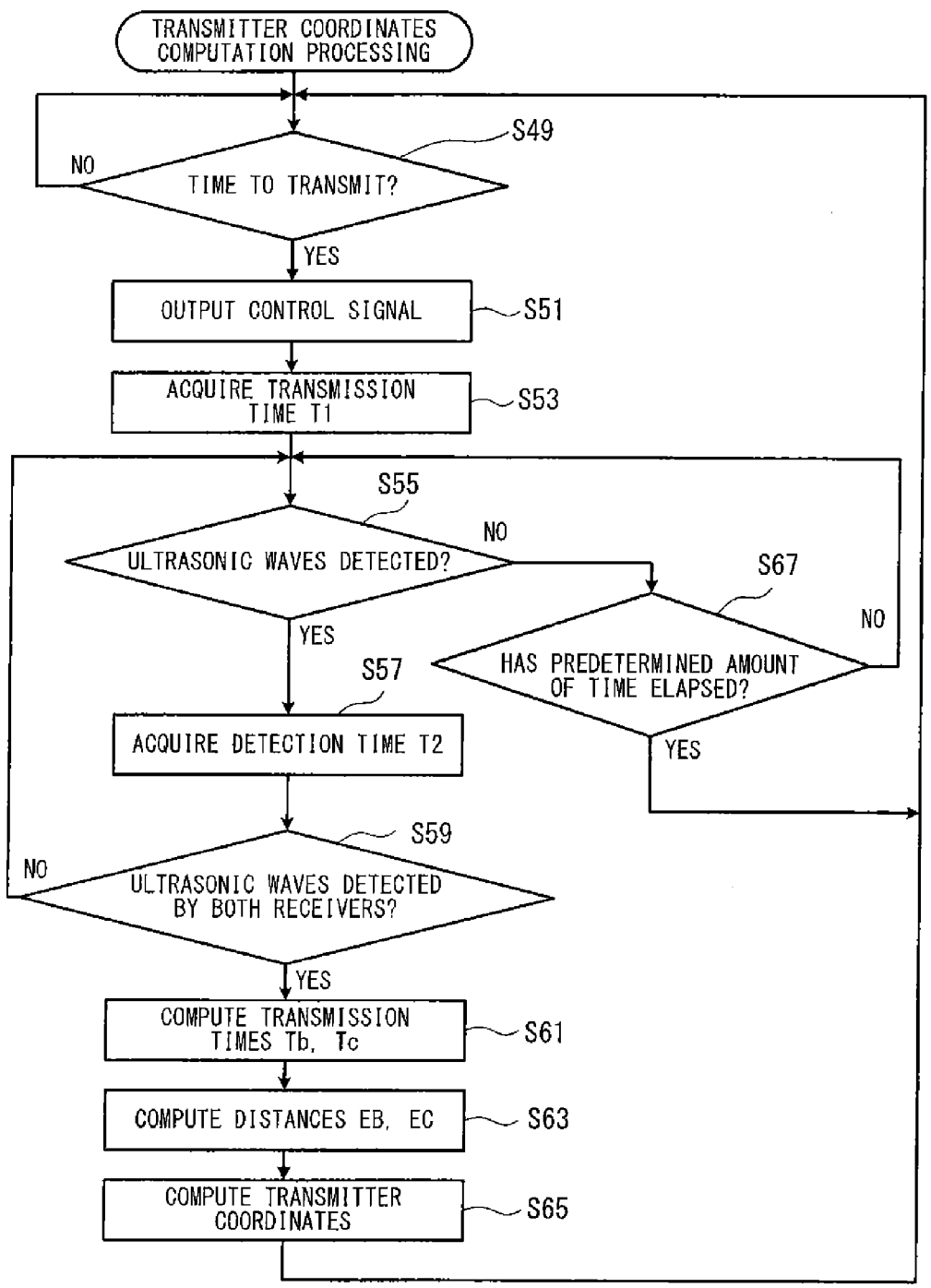
FIG. 9 is a flowchart that shows transmitter coordinates computation processing.

The indicated point coordinates computation processing will be explained with reference to FIG. 8. The indicated point coordinates computation processing is performed by the CPU 61 of the sewing machine 101 in accordance with instructions that are contained in the first coordinates computation program 500 that is stored in the ROM 62. In a case where the user has selected an ultrasonic wave mode by using the touch panel 16, the CPU 61 may perform the indicated point coordinates computation processing in parallel with the transmitter coordinates computation processing that is shown in FIG. 9. Each of the steps that are shown in the flowchart indicates processing by the CPU 61.

First, at Step S17, the CPU 61 determines whether or not the switch 913 has been pressed. Specifically, the CPU 61 determines whether or not the indication signal that is output from the signal output circuit 914 of the ultrasound pen 91 has been detected. In a case where the CPU 61 determines that the indication signal has been detected (YES at Step S17), the CPU 61 advances the processing to Step S21. Specifically, the signal output circuit 914 outputs the indication signal to the CPU 61. The velocity at which the indication signal travels to the CPU 61 is much greater than the velocity at which the ultrasonic waves travel to the receivers 94, 95. Therefore, the indication signal arrives at the CPU 61 at approximately the same time that the switch 913 is turned on. When the indication signal arrives at the CPU 61, the CPU 61 determines that the indication signal has been detected.

On the other hand, in a case where the CPU 61 determines that the indication signal has not been detected (NO at Step S17), the CPU 61 repeats the processing at Step S17.

At Step S21, the CPU 61 acquires from the RAM 63 the coordinates of the transmitter 915 at the time when the switch 913 was pressed. Specifically, as will be described in detail below, in the transmitter coordinates computation processing (refer to FIG. 9), every time a specified time period UT elapses, the CPU 61 outputs to the transmitter 915 the control signal that instructs the transmitter 915 to transmit the ultrasonic waves, and the transmitter 915 transmits the ultrasonic waves. Then, when the receivers 94, 95 detect the ultrasonic waves, the CPU 61 computes the transmitter coordinates E (Xe, Ye, Ze) and stores them in the RAM 63. The CPU 61, referring to the timer 27, examines the transmission times for the ultrasonic waves that were transmitted every time the specified time period UT elapsed and specifies the transmission time that is the closest to the current time as a transmission time TP when the switch 913 was pressed. The CPU 61 acquires from the RAM 63 the transmitter coordinates E that correspond to the specified transmission time TP and treats the acquired transmitter coordinates E as coordinates EP of the transmitter 915 at the time when the switch 913 was pressed.

At Step S23, the CPU 61 acquires from the RAM 63 Ny sets of the coordinates of the transmitter 915 before the pressing of the switch 913. Specifically, the CPU 61 examines the transmitter coordinates E that have been computed and stored in the RAM 63 in the transmitter coordinates computation processing (refer to FIG. 9) and acquires from the RAM 63 the Ny sets of the coordinates that correspond to the Ny successive transmission times T1 that preceded the transmission time TP that has been specified at Step S21.

At Step S25, the CPU 61 acquires from the RAM 63 Nz sets of the coordinates of the transmitter 915 after the pressing of the switch 913. Specifically, the CPU 61 examines the transmitter coordinates E that have been computed and stored in the RAM 63 in the transmitter coordinates computation processing (refer to FIG. 9) and acquires from the RAM 63 the Nz sets of the coordinates that correspond to the Nz successive transmission times T1 that followed the transmission time TP that has been specified at Step S21.

At Step S27, the CPU 61 computes a movement direction on the bed surface 98 on which the ultrasound pen 91 has moved, based on the plurality of the sets of coordinates that the CPU 61 acquired at Steps S21, S23, and S25.

Computation of a Movement Direction 920

Figure 10:
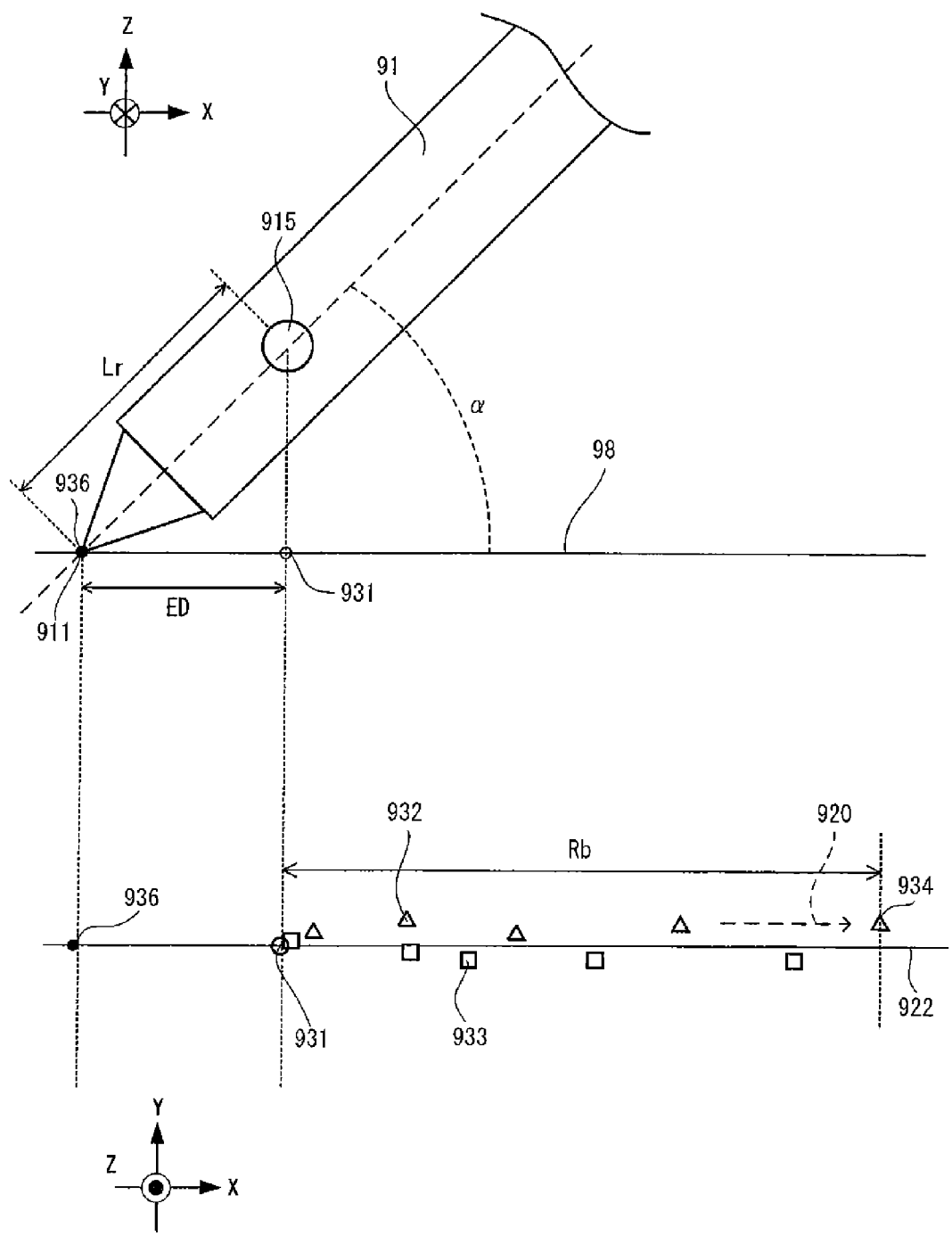
FIG. 10 is a front view of the ultrasound pen and a plan view that shows distribution of the transmitter coordinates E on a plane.

The processing that computes the movement direction of the ultrasound pen 91 on the bed surface 98 (Step S27) will be explained in detail with reference to FIG. 10. The left-right direction in FIG. 10 is equivalent to the X axis direction. For the ultrasound pen 91 and the bed surface 98 in the upper part of FIG. 10, the up-down direction is equivalent to the Z axis direction. For a movement direction 920 and an approximated straight line 922 in the lower part of FIG. 10, the up-down direction is equivalent to the Y axis direction, while the direction that is orthogonal to the plane of the sheet is equivalent to the Z axis direction.

The CPU 61 computes the movement direction 920 of the ultrasound pen 91 on the bed surface 98 based on the direction on the bed surface 98 from a first point 931 toward second points 932 that were computed later than the first point 931, each one of the first point 931, the second points 932, and third points 933 corresponding to one of a plurality of sets of coordinates. The first point 931 corresponds to the coordinates at the time when the switch 913 was pressed. The second points 932 correspond to the Nz sets of the coordinates after the pressing of the switch 913. The third points 933 correspond to the Ny sets of the coordinates before the pressing of the switch 913. In FIG. 10, the first point 931, the second points 932, and the third points 933 are respectively indicated by a circle, triangles, and squares. Specifically, the CPU 61 computes the approximated straight line 922. The approximated straight line 922 is a straight line that passes through the first point 931 and is close to the Nz second points 932 after the pressing of the switch 913. The CPU 61 may compute the approximated straight line 922 by the known least squares method, for example. The CPU 61 stores, in the RAM 63 as the movement direction 920 of the ultrasound pen 91 on the bed surface 98, the direction in which the approximated straight line 922 extends.

Figure 11:
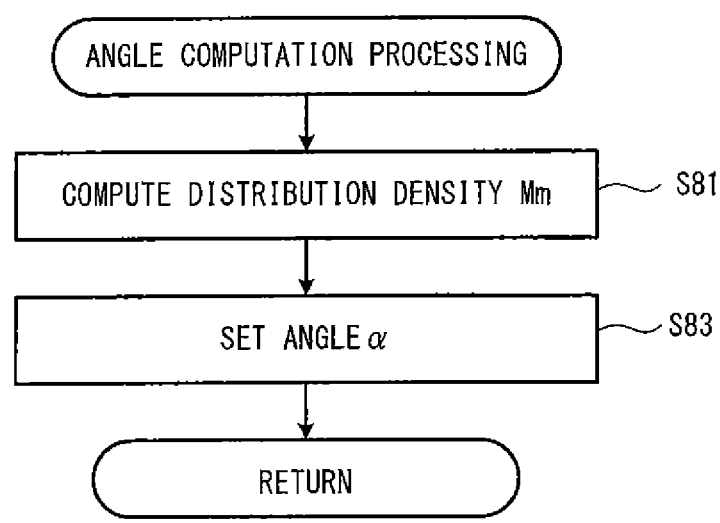
FIG. 11 is a flowchart that shows angle computation processing.

At Step S29, the CPU 61 performs angle computation processing that is shown in FIG. 11, In the angle computation processing, the CPU 61 computes an angle a between the bed surface 98 and the longitudinal axis of the ultrasound pen 91, based on the coordinates of the transmitter 915 before and after the switch 913 was pressed, the coordinates being stored in the RAM 63.

Computation of the Angle α

Figure 12:
FIG. 12 is an explanatory figure that shows contents of a table.

The angle computation processing that computes the angle α will be explained in detail with reference to FIGS. 10 to 12. After the processing at Step S29 of the indicated point coordinates computation processing (refer to FIG. 8) has been started, the CPU 61 advances the processing to Step S81 of the angle computation processing that is shown in FIG. 11.

At Step S81, the CPU 61 computes a distribution density Mm. The distribution density Mm is the distribution density, with respect to the movement direction 920 of the ultrasound pen 91 on the bed surface 98, of the first point 931, the second points 932, and the third points 933 that correspond to the plurality of the sets of coordinates on the bed surface 98, which have been acquired at Steps S21, S23, and S25 in the indicated point coordinates computation processing (refer to FIG. 8). The distribution density Mm satisfies the relationship that is described by Equation (7) below.

$$Mm=(Ny+Nz+1)/Rb \qquad (7):$$

The method for computing a range Rb will be explained. The range Rb is the range of the (Ny+Nz+1) sets of the coordinates at the time when the switch 913 was pressed and before and after that time. Specifically, the CPU 61 acquires the coordinates for a point 934 that is the most distant point from the first point 931 that corresponds to the coordinates EP at the time when the switch 913 was pressed. The CPU 61 uses the distance between the coordinates for the first point 931 and the coordinates for the point 934 as the value for the range Rb.

An example of the computing of the distribution density Mm will be explained. In a case where Ny equals 50, Nz equals 50, and the range Rb equals 0.5 millimeters, for example, the distribution density Mm equals (50+50+1)/0.5, or 200 dots per millimeter.

At Step S83, the CPU 61 sets the angle α between the bed surface 98 and the longitudinal axis of the ultrasound pen 91 by referring to the angle α that corresponds to the distribution density Mm that was computed at Step S81 in the table 540. As shown in FIG. 12, the distribution density Mm and the angle α are associated with one another in the table 540. Specifically, in the case where the distribution density Mm is 200 dots per millimeter, for example, the CPU 61 sets the angle α in the range of 60 degrees to 75 degrees, based on the table 540. In the present embodiment, the CPU 61 sets the angle that corresponds to the distribution density Mm to the smallest value in the range of values for the angle α that corresponds to the distribution density Mm. Therefore, in the case where the distribution density Mm is 200 dots per millimeter, the CPU 61 sets the angle α to 60 degrees. After the processing at Step S83 ends, the CPU 61 terminates the angle computation processing and advances the processing to Step S30 in the indicated point coordinates computation processing, which is shown in FIG. 8.

At Step S30, the CPU 61 computes the coordinates of the indicated point 936 that the pen tip 911 has indicated on the bed surface 98, based on the coordinates EP of the transmitter 915 at the time when the switch 913 was pressed, which have been acquired at Step S21, on the movement direction 920 of the ultrasound pen 91 on the bed surface 98, which has been acquired at Step S27, and on the angle α between the bed surface 98 and the longitudinal axis of the ultrasound pen 91, which has been acquired at Step S29. After the processing at Step 830 ends, the CPU 61 terminates the indicated point coordinates computation processing.

Computation of the Indicated Point 936

The processing that computes the coordinates of the indicated point 936 at Step S30 will be explained in detail with reference to FIG. 10.

The direction in which the indicated point 936 is located in relation to the first point 931 will be explained. The movement direction 920 is the direction from the first point 931 toward the second points 932 that correspond to the coordinates after the pressing of the switch 913. The pen tip 911 is generally located in the opposite direction from the movement direction 920 of the ultrasound pen 91 after the switch 913 was pressed in a state in which the user has used the pen tip 911 to indicate the indicated point 936. Therefore, in relation to the first point 931, the indicated point 936 is located in the opposite direction from the movement direction 920. In a case where the movement direction 920 is toward the right (the positive X axis direction), the indicated point 936 is located toward the left (the negative X axis direction), which is the opposite direction from the movement direction 920 in relation to the first point 931.

A distance ED will be explained. In the present embodiment, the computation of the distance ED is performed on the assumption that a virtual plane that is parallel to the bed surface 98 and that passes through the position of the transmitter 915 is on the bed surface 98. The distance ED is the distance between the indicated point 936 and the first point 931, which corresponds to the coordinates of the transmitter 915 on the bed surface 98 at the time when the switch 913 was pressed. The distance ED satisfies the relationship that is described by Equation (8) below.

$$ED=Lr \times \cos\alpha \qquad (8):$$

An example of the computing of the distance ED will be explained. In a case where the distance Lr between the pen tip 911 and the transmitter 915 equals 20 millimeters and the angle α between the bed surface 98 and the longitudinal axis of the ultrasound pen 91 equals 60 degrees, for example, the distance ED equals 20 ×cos 60°, or 10 millimeters.

An example of the computing of the coordinates of the indicated point 936 will be explained. The coordinates of the indicated point 936 are coordinates on the bed surface 98 that are located at the distance ED from the first point 931, in the opposite direction from the movement direction 920. In a case where the coordinates E of the first point 931 are (0, −10, 0), the opposite direction from the movement direction 920 is the negative X axis direction, and the distance ED is 10 millimeters, the coordinates of the indicated point 936 are at a distance of 10 millimeters from the first point 931 in the negative X axis direction, making the coordinates (−10, '110, 0).

Computation of the Transmitter Coordinates E

The transmitter coordinates computation processing will be explained in detail with reference to FIG. 9. The transmitter coordinates computation processing is performed by the CPU 61 of the sewing machine 101 in accordance with instructions that are contained in the second coordinates computation program 505 that is stored in the ROM 62. In a case where the ultrasonic wave mode has been selected as described above, the CPU 61 performs the transmitter coordinates computation processing in parallel with the indicated point coordinates computation processing that is shown in FIG. 8. In a case where the CPU 61 has received a command to terminate the ultrasonic wave mode, the CPU 61 terminates the transmitter coordinates computation processing.

First, at Step S49, the CPU 61 refers to the timer 27 and determines whether or not the specified time period UT has elapsed, meaning the time to transmit the ultrasonic waves has arrived (Step S49). The specified time period UT may be 6 milliseconds, for example. In a case where the CPU 61 determines that the time to transmit the ultrasonic waves has not arrived (NO at Step S49), the CPU 61 repeats the processing at Step S49. In a case where the CPU 61 determines that the time to transmit the ultrasonic waves has arrived (YES at Step S49), the CPU 61 outputs to the transmitter 915 of the ultrasound pen 91 the control signal that instructs the transmitter 915 to transmit the ultrasonic waves (Step S51). The transmitter 915 receives the control signal from the CPU 61 and transmits the ultrasonic waves every time the specified time period UT elapses.

At Step S53, the CPU 61 acquires, as the transmission time T1, the time that the control signal was output to the transmitter 915 at Step S51. Specifically, the CPU 61 specifies and acquires, as the transmission time T1, the time at which the CPU 61 determined that the time to transmit had arrived at Step S49 immediately before outputting the control signal at Step S51. The CPU 61 stores the acquired transmission time T1 in the RAM 63.

At Step S55, the CPU 61 determines whether or not the ultrasonic waves that were transmitted from the ultrasound pen 91 have been detected by one of the receivers 94, 95. In a case where the CPU 61 determines that the ultrasonic waves have been detected by one of the receivers 94, 95 (YES at Step S55), the CPU 61 advances the processing to Step S57. In a case where the CPU 61 determines that the ultrasonic waves have not been detected by one of the receivers 94, 95 (NO at Step S55), the CPU 61 advances the processing to Step S67. Specifically, when the ultrasonic waves are detected by one of the receivers 94, 95, a detection signal is output to the CPU 61 through the input/output interface 65. When the CPU 61 receives the detection signal, the CPU 61 determines that the ultrasonic waves have been detected.

At Step S67, the CPU 61 refers to the timer 27 and determines whether or not a predetermined amount of time has elapsed since the transmission time T1. The predetermined amount of time is a length of time that is definitely sufficient for the ultrasonic waves to be transmitted from the ultrasound pen 91 and to arrive at the receivers 94, 95. The predetermined amount of time may be 1 millisecond, for example. In a case where the CPU 61 determines that the predetermined amount of time has not elapsed (NO at Step S67), the CPU 61 returns the processing to Step S55. In other words, the CPU 61 waits for the predetermined amount of time for the ultrasonic waves to be detected by one of the receivers 94, 95. It is assumed that, for example, that the ultrasonic waves that were transmitted from the transmitter 915 of the ultrasound pen 91 did not arrive at one of the receivers 94, 95 within the predetermined amount of time, because they have been blocked by the user's hand or arm, or by the work cloth 100 or the like. In other words, if the predetermined amount of time elapses without either one of the receivers 94, 95 having detected the ultrasonic waves (YES at Step S67), the CPU 61 returns the processing to Step S49.

At Step S57, the CPU 61 refers to the timer 27 and specifies the time when the ultrasonic waves were received by one of the receivers 94, 95. The CPU 61 stores the specified time in the RAM 63 as the detection time T2. The time when the ultrasonic waves were received by one of the receivers 94, 95 may be specifically the time when the CPU 61 received the detection signal.

At Step S59, the CPU 61 determines whether or not the ultrasonic waves have been detected by both of the receivers 94, 95. In a case where the CPU 61 determines that the ultrasonic waves have been detected by both of the receivers 94, 95 (YES at Step S59), the CPU 61 advances the processing to Step S61. In a case where the CPU 61 determines that the ultrasonic waves have been detected by only one of the receivers 94, 95 (NO at Step S59), the CPU 61 returns the processing to Step S55.

At Step S61, the CPU 61 computes the transmission times Tb, Tc. Specifically, the CPU 61 computes the transmission times Tb, Tc based on the transmission time T1 and the detection times T2. More specifically, the CPU 61 computes the transmission time Tb by subtracting the transmission time T1 from the detection time T2 for the receiver 94. The CPU 61 computes the transmission time Tc by subtracting the transmission time T1 from the detection time T2 for the receiver 95. The CPU 61 stores the transmission times Tb, Tc in the RAM 63.

At Step S63, the CPU 61 computes the distances EB, EC between the transmitter 915 and the receivers 94, 95, respectively, based on the transmission times Tb, Tc and the sound velocity VS, which is the velocity at which the ultrasonic waves travel. Specifically, the CPU 61 computes the distances EB, EC by multiplying the computed transmission times Tb, Tc by the sound velocity VS (refer to Equations (3), (4)). The CPU 61 stores the distances EB, EC in the RAM 63.

At Step S65, the CPU 61 computes the transmitter coordinates E (Xe, Ye, Ze) on the bed surface 98 on the assumption that a virtual plane that is parallel to the bed surface 98 and that passes through the position of the transmitter 915 is on the bed surface 98. Specifically, the CPU 61 computes the transmitter coordinates E (Xe, Ye, Ze (=0)) by using the coordinates B (Xb, Yb, Zb), the coordinates C (Xc, Yc, Zc), and the distances EB, EC in and solving the simultaneous Equations (5) and (6). In this manner, the CPU 61 computes the coordinates E for the transmitter 915 on the work cloth 100 that were indicated by the ultrasound pen 91. The CPU 61 stores the transmitter coordinates E as the transmitter coordinates data 430 in the RAM 63, in association with the transmission time T1.

After the processing at Step S65 ends, the CPU 61 returns the processing to Step S49. The RAM 63 stores a predetermined number of sets of the transmitter coordinates E that were recently computed at Step S65. When the number of sets of the transmitter coordinates E to be stored in the RAM 63 exceeds the predetermined number, the CPU 61 may store the most recent set of the transmitter coordinates E in the RAM 63 and may delete the oldest set of the transmitter coordinates E from the RAM 63. The predetermined number of sets of the transmitter coordinates E may be at least (Ny+Nz+1). For example, Ny and Nz may each have a value of 100. In that case, the predetermined number of sets of the transmitter coordinates E may be 201. When the CPU 61 receives a command to terminate the ultrasonic wave mode, the CPU 61 terminates the transmitter coordinates computation processing.

Effects of the Present Embodiment

In the present embodiment, in the indicated point coordinates computation processing (refer to FIG. 8), the CPU 61 computes the angle α between the bed surface 98 and the longitudinal axis of the ultrasound pen 91, as well as the movement direction 920 of the ultrasound pen 91, based on at least one part of sets of coordinates, among sets of coordinates that indicate the position of the transmitter 915 on the bed surface 98 at the time that the switch 913 was pressed, as well as positions of the transmitter 915 on the bed surface 98 both before and after the pressing of the switch 913 (Steps S21 to S29). Based on the angle α and the movement direction 920, the CPU 61 computes the coordinates of the indicated point 936 (Step S30). It is thus possible to compute the coordinates of the indicated point 936 accurately using only one transmitter 915.

At Steps S61, S63 in the transmitter coordinates computation processing (refer to FIG. 9), the CPU 61 computes the distances EB, EC between the transmitter 915 and the receivers 94, 95, respectively, based on the transmission time T1, the detection times T2, and the sound velocity VS. At Step S65, the CPU 61 computes the transmitter coordinates E for the point that is separated from the receiver 94 by the distance EB and separated from the receiver 95 by the distance EC. The acquiring of the transmission time T1 and the detection times T2 makes it possible to specify the coordinates of the indicated point 936 using a simple configuration.

At Steps S49 and S51, the CPU 61 outputs the control signal to the transmitter 915 every time the specified time period UT elapses, and the transmitter 915 transmits the ultrasonic waves. Therefore, the transmission time T1 and the detection times T2 are each determined as unique values. That makes it possible to specify the coordinates of the indicated point 936 even more accurately.

At Step S27 in the indicated point coordinates computation processing (refer to FIG. 8), the CPU 61 computes the movement direction 920 based on the track of the sets of coordinates. The computing of the movement direction 920 makes it possible to specify the coordinates of the indicated point 936 using a simple configuration.

At Step S29 (in the angle computation processing that is shown in FIG. 11), the CPU 61 computes the angle α based on the distribution density Mm of the sets of coordinates. The computing of the angle α makes it possible to specify the coordinates of the indicated point 936 using a simple configuration.

Modified Examples

Hereinafter, examples of modifications that can be applied to the embodiment that is described above will be explained.

In the embodiment that is described above, the CPU 61 computes the movement direction 920 of the ultrasound pen 91 on the bed surface 98 based on the direction on the bed surface 98 from the first point 931 toward the second points 932, which were computed later than the first point 931, each one of the first point 931, the second points 932, and the third points 933 corresponding to one of the plurality of the sets of coordinates. However, the CPU 61 is not limited to using the Nz sets of coordinates after the pressing of the switch 913, and the CPU 61 may compute the movement direction 920 on the bed surface 98 based on the direction on the bed surface 98 from the Ny third points 933 before the pressing of the switch 913 toward the first point 931 at the time when the switch 913 was pressed. The movement direction 920 on the bed surface 98 may be computed using all of the first point 931, the second points 932, and the third points 933 that correspond to the coordinates at the time when the switch 913 was pressed and before and after that time.

The programs that are described above may be stored on a computer-readable storage medium, such as a hard disk, a flexible disk, a CD-ROM, a DVD, or the like, and the programs may be executed by being read out from the storage medium by a computer. The programs may be in the form of transmission media that can be distributed through a network such as the Internet or the like.

In the embodiment that is described above, the processing that computes the coordinates of the position from which the ultrasonic waves are transmitted, the processing that computes the movement direction 920 of the ultrasound pen 91 on the bed surface 98, the processing that computes the angle a, the processing that computes the coordinates of the indicated point 936, the processing that computes the distances EB, EC between the transmitter 915 and the receivers 94, 95, respectively, the processing that computes the transmitter coordinates E on the bed surface 98, the processing that computes the distribution density Mm, and the processing that sets the angle α are implemented in the form of software that the CPU 61 executes. However, each of the types of processing may be implemented in the form of hardware.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A coordinate computation device comprising:
 a position indication portion that includes an indicating portion, a switch, and a transmitter, the indicating portion being configured to indicate a position on a plane, the transmitter being configured to transmit ultrasonic waves, and the position indication portion being long in a direction of a virtual straight line that passes through the indicating portion and the transmitter;
 a detection portion that is configured to detect the ultrasonic waves that are transmitted by the transmitter;
 a processor; and
 a memory that is configured to store computer-readable instructions, wherein the computer-readable instructions cause the processor to perform processes comprising:
  computing sets of first coordinates, based on times when the detection portion detects the ultrasonic waves, the sets of the first coordinates respectively indicating positions on the plane that respectively correspond to positions of the transmitter at a time when the switch is turned on and at times before and after the switch is turned on;
  computing a movement direction of the position indication portion on the plane, based on at least one part of the sets of the computed first coordinates;
  computing an angle that is formed between the plane and the direction in which the position indication portion is long, based on at least one part of the sets of the computed first coordinates; and
  computing a set of second coordinates, based on the computed movement direction, the computed angle, and a set of third coordinates among the sets of the computed first coordinates, the set of the second coordinates indicating an indicated point on the plane, the indicated point being the position that is indicated by the indicating portion, and the set of the third coordinates indicating a position on the plane that corresponds to the position of the transmitter at the time when the switch is turned on.

2. The coordinate computation device according to claim 1, wherein
the computing of the sets of the first coordinates includes computing a distance between the transmitter and the detection portion, based on a velocity at which the ultrasonic waves travel, times when the ultrasonic waves are transmitted by the transmitter, and the times when the detection portion detects the ultrasonic waves that are transmitted from the transmitter, and computing the positions on the plane that respectively correspond to the positions of the transmitter.

3. The coordinate computation device according to claim 2, wherein
the computing of the sets of the first coordinates includes computing, based on the times when the detection portion detects the ultrasonic waves, the positions on the plane that respectively correspond to the positions of the transmitter at times at each of which a specified time period elapses, starting from before the switch is turned on and continuing after the switch is turned on.

4. The coordinate computation device according to claim 1, wherein
the computing of the movement direction includes computing the movement direction based on a direction on the plane from a first point to a second point, the first point corresponding to one of the sets of first coordinates, the second point corresponding to another one of the sets of first coordinates, and coordinates of the second point indicating a position of the transmitter after the switch is turned on.

5. The coordinate computation device according to claim 1, wherein
the computing of the angle includes:
computing a distribution density of the sets of the first coordinates on the plane in relation to the computed movement direction; and
setting, with reference to a table, an angle corresponding to the computed distribution density, the angle and the distribution density being stored in association with each other in the table.

6. The coordinate computation device according to claim 1, wherein
the computing of the set of the second coordinates includes computing the set of the second coordinates based on a distance between the indicating portion and the transmitter.

7. The coordinate computation device according to claim 1, wherein
the position indication portion is an ultrasound pen.

8. A sewing machine comprising:
a bed that includes a bed surface being a top surface thereof;
a position indication portion that includes an indicating portion, a switch, and a transmitter, the indicating portion being configured to indicate a position on the bed surface, the transmitter being configured to transmit ultrasonic waves, and the position indication portion being long in a direction of a virtual straight line that passes through the indicating portion and the transmitter;
a detection portion that is configured to detect the ultrasonic waves that are transmitted by the transmitter;
a processor; and
a memory that is configured to store computer-readable instructions, wherein the computer-readable instructions cause the processor to perform processes comprising:
computing sets of first coordinates, based on times when the detection portion detects the ultrasonic waves, the sets of the first coordinates respectively indicating positions on the bed surface that respectively correspond to positions of the transmitter at a time when the switch is turned on and at times before and after the switch is turned on;
computing a movement direction of the position indication portion on the bed surface, based on at least one part of the sets of the computed first coordinates;
computing an angle that is formed between the bed surface and the direction in which the position indication portion is long, based on at least one part of the sets of the computed first coordinates; and
computing a set of second coordinates, based on the computed movement direction, the computed angle, and a set of third coordinates among the sets of the computed first coordinates, the set of the second coordinates indicating an indicated point on the bed surface, the indicated point being the position that is indicated by the indicating portion, and the set of the third coordinates indicating a position on the bed surface that corresponds to the position of the transmitter at the time when the switch is turned on.

9. The sewing machine according to claim 8, wherein
the computing of the sets of the first coordinates includes computing a distance between the transmitter and the detection portion, based on a velocity at which the ultrasonic waves travel, times when the ultrasonic waves are transmitted by the transmitter, and the times when the detection portion detects the ultrasonic waves that are transmitted from the transmitter, and computing the positions on the bed surface that respectively correspond to the positions of the transmitter.

10. The sewing machine according to claim 9, wherein
the computing of the sets of the first coordinates includes computing, based on the times when the detection portion detects the ultrasonic waves, the positions on the bed surface that respectively correspond to the positions of the transmitter at times at each of which a specified time period elapses, starting from before the switch is turned on and continuing after the switch is turned on.

11. The sewing machine according to claim 8, wherein
the computing of the movement direction includes computing the movement direction based on a direction on the bed surface from a first point to a second point, the first point corresponding to one of the sets of first coordinates, the second point corresponding to another one of the sets of first coordinates, and coordinates of the second point indicating a position of the transmitter after the switch is turned on.

12. The sewing machine according to claim 8, wherein
the computing of the angle includes:
computing a distribution density of the sets of the first coordinates on the bed surface in relation to the computed movement direction; and
setting, with reference to a table, an angle corresponding to the computed distribution density, the angle and the distribution density being stored in association with each other in the table.

13. The sewing machine according to claim 8, wherein
the computing of the set of the second coordinates includes computing the set of the second coordinates based on a distance between the indicating portion and the transmitter.

14. The sewing machine according to claim 8, wherein
the position indication portion is an ultrasound pen.

* * * * *